(12) United States Patent
Feinberg

(10) Patent No.: US 7,139,912 B2
(45) Date of Patent: Nov. 21, 2006

(54) DEVICE AUTHENTICATION

(75) Inventor: Paul H. Feinberg, River Vale, NJ (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 791 days.

(21) Appl. No.: 09/837,283

(22) Filed: Apr. 18, 2001

(65) Prior Publication Data

US 2001/0052075 A1 Dec. 13, 2001

Related U.S. Application Data

(60) Provisional application No. 60/210,504, filed on Jun. 9, 2000.

(51) Int. Cl.
*H04L 9/00* (2006.01)

(52) U.S. Cl. .................. 713/168; 463/29; 273/139

(58) Field of Classification Search ........ 713/168–169, 713/172; 446/297, 73; 380/24; 235/380; 395/384; 434/169; 84/645; 463/29, 17; 273/139

See application file for complete search history.

(56) References Cited

U.S. PATENT DOCUMENTS

| | | | | |
|---|---|---|---|---|
| 5,109,152 A | * | 4/1992 | Takagi et al. | 235/380 |
| 5,355,413 A | * | 10/1994 | Ohno | 713/159 |
| 5,505,449 A | * | 4/1996 | Eberhardt et al. | 463/29 |
| 5,651,123 A | * | 7/1997 | Nakagawa et al. | 712/208 |
| 5,746,602 A | * | 5/1998 | Kikinis | 434/169 |
| 6,032,257 A | | 2/2000 | Olarig et al. | 713/200 |
| 6,075,195 A | * | 6/2000 | Gabai et al. | 84/645 |

* cited by examiner

*Primary Examiner*—Kim Vu
*Assistant Examiner*—T. B. Truong
(74) *Attorney, Agent, or Firm*—Lerner, David, Littenberg, Krumholz & Mentlik, LLP

(57) ABSTRACT

A method and system is provided which generates and uses authentication codes so that when one device is connected to another device, the devices can only communicate with one another. The method and system preferably counts the number of times the devices have successfully communicated as part of the authentication process.

24 Claims, 3 Drawing Sheets

DEVICE AUTHENTICATION

CROSS-REFERENCE TO RELATED APPLICATIONS

The present application claims benefit of U.S. Provisional Application No. 60/210,504, filed on Jun. 9, 2000, which is hereby incorporated by reference.

BACKGROUND OF THE INVENTION

Manufacturers occasionally want to uniquely interface their hardware with other commercial hardware devices. For example, a manufacturer may want to insure that when a customer is interfacing devices with the manufacturer's hardware, the device meets the manufacturer's approval. Also, in order to prevent theft of computers and computer related hardware, it is known to encode the hardware components such that a digitally authenticated handshake must be performed between the system and the component at power-up. If the handshake is successful, normal operation continues with all enhancements. If the handshake is unsuccessful, the device is disabled or shifted into a lower performance mode.

However, it would be beneficial to increase the security of prior methods and products which authenticate devices when they are connected to one another.

SUMMARY OF THE INVENTION

The present invention addresses these needs.

In one aspect, a method of transferring information between devices upon connection and reconnection includes: providing a first device having a first identifier; providing a second device having a second identifier; the first device sending the first identifier to the second device during a first connection; the second device sending the second identifier to the first device during the first connection; the first device storing the second identifier and the second device storing the first identifier; and when the first and second devices are disconnected and reconnected, the first device sending the first identifier to the second device and the second device sending the second identifier to the first device during the reconnection, and each device comparing the received identifier against the stored identifier and sending additional information to the other device depending upon the result of the comparison.

Another aspect provides a method of authenticating device. This method includes: receiving a first value from the device, the first value being different from an identifier associated with the device; determining the identifier from the value, the value being a function of the identifier and the number of times the device has been authenticated; comparing the identifier determined from the value against a pre-stored identifier; and authenticating the device based on the result of the comparison.

A further aspect is a system which takes an action in response to a signal from a device. The system includes: an increment counter associated with a value representing the number of times the system has taken the action in response to a signal from the device; a random number generator using the increment counter as a seed; memory for storing a value identifying the device; instructions including using the value of the increment counter to extract the value identifying the device from a value transmitted from the device, comparing the identification value with the value stored in memory, and taking the action dependant upon the results of the comparison.

Yet a further aspect provides a method of a destination being authenticated by a source. This method comprises the destination: maintaining a seed value which is equivalent to a seed value maintained at the source, the seed changing over time; generating a number based on the seed and based on a value identifying the destination whereby the generated number is different from the seed and the destination's identification value; transmitting the generated number to the source; and being authenticated to receive information from the source or send information which will be used by the source, the authentication being dependant upon the source using the seed to extract the destination's identification value and comparing the destination's identification value with the value of a destination known by the source to be authentic.

Still another aspect provides a system of devices involving: a first device having an identifier and pseudo-random number generator and a second device, upon the connection of the first device to the second device: the first device sends a value based on the output of the pseudo-random number generator and identifier, the second device receives the value, compares the received value with a prestored value, and depending on the results of the comparison, sends or receives information to or from the first device.

DETAILED DESCRIPTION OF THE PREFERRED EMBODIMENTS

Figure 1:
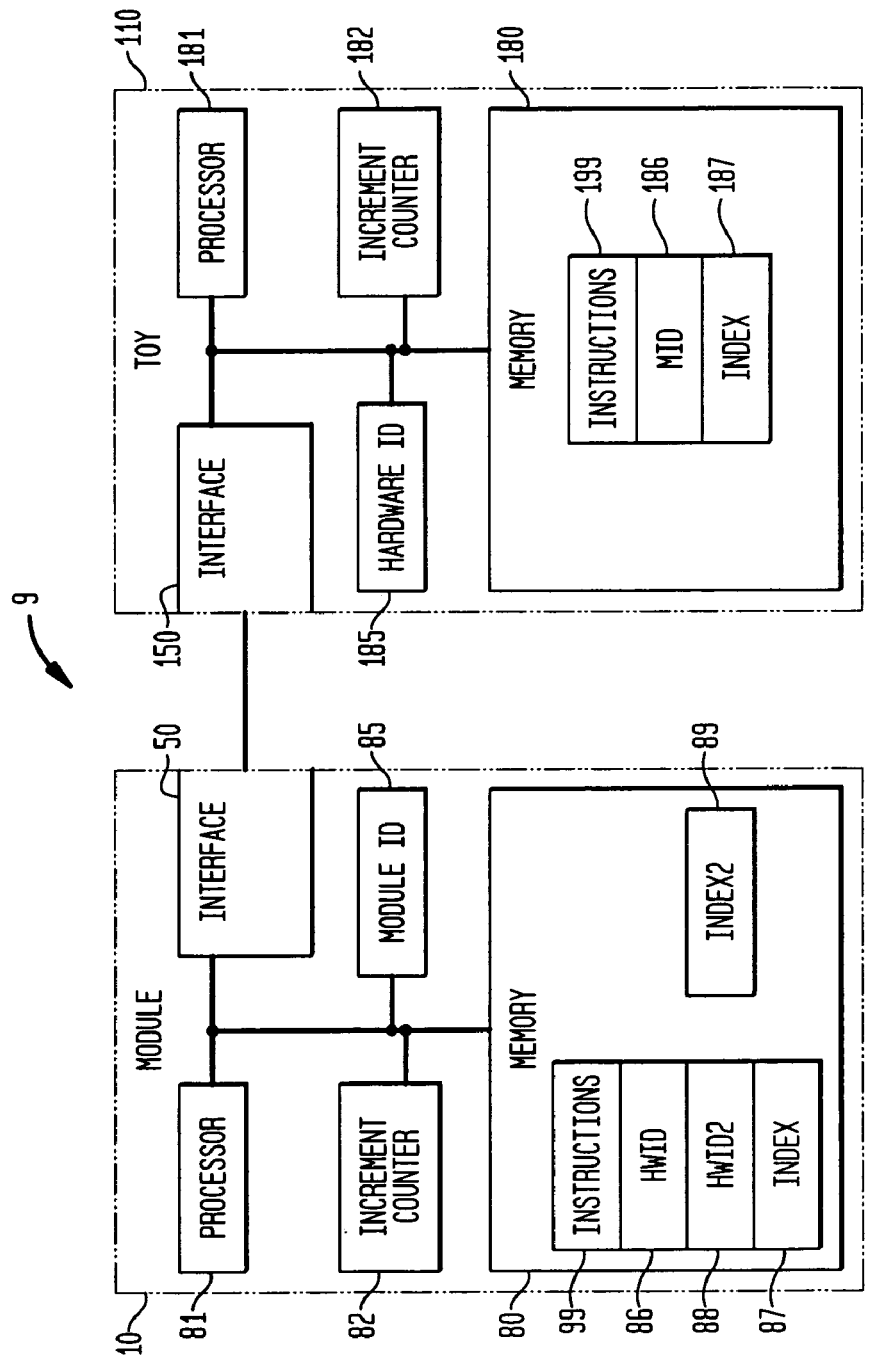
FIG. 1 is a schematic diagram of a system in accordance with an embodiment of the invention.

A system 9 of a module devices 10 and toy device 110 in accordance with one embodiment of the invention is shown in FIG. 1. In this embodiment, the module provides information to the toy when they are connected together. Module 10 includes a processor 81, an increment counter 82, non-volatile memory 80, Module ID (MID) 185 and an interface 50, all of which are operatively connected to one another. The processor executes instructions 99 which may be, but are not necessarily, stored in memory 80. The interface 100 includes a transmitter for transmitting data out of the device (such as to toy 110) and a receiver for receiving data into the device (such as from toy 110). The interface may include a set of pins sufficient to transfer information. Increment counter 82 holds a value which is incremented by some amount in response to a command from processor 81. Although shown separately from instructions 99, it may actually be a routine within the instructions. Regardless, in this embodiment, the increment counter 82 shall be considered to increment index value 87 by one in response to a command from processor 81.

Memory 80 is capable of holding a variety of data such as hardware ID data (HWID) 86, index 87 for the increment counter 82 and authorization code data 88. The HWID 86 contains the identification number of another device which has been connected to module 10. Although the memory storage unit 80 depicted in FIG. 1 only shows a few data locations, it should be appreciated that a typical device can include a large number of data locations.

Module ID (MID) 85 contains a value which can be accessed by processor 81. The Module ID 85 is shown schematically outside of memory 80 to indicate the fact that, in this embodiment, the value may be hardwired and not writable. However, the MID 85 may be stored in any manner such that it is accessible by processor 81. Preferably, each different module 10 has a unique MID which is assigned by the manufacturer. Thus, the MID may be a serial number.

Toy device 110 has structure similar to module 10. Accordingly, it has an interface 150, memory 180 (including instructions 99 and index 187), processor 181 and increment counter 182. The toy 110 also stores the identification of a module in MID 186. The toy further has its own identifier as indicated by Hardware ID (HWID) 185.

Figure 2A:
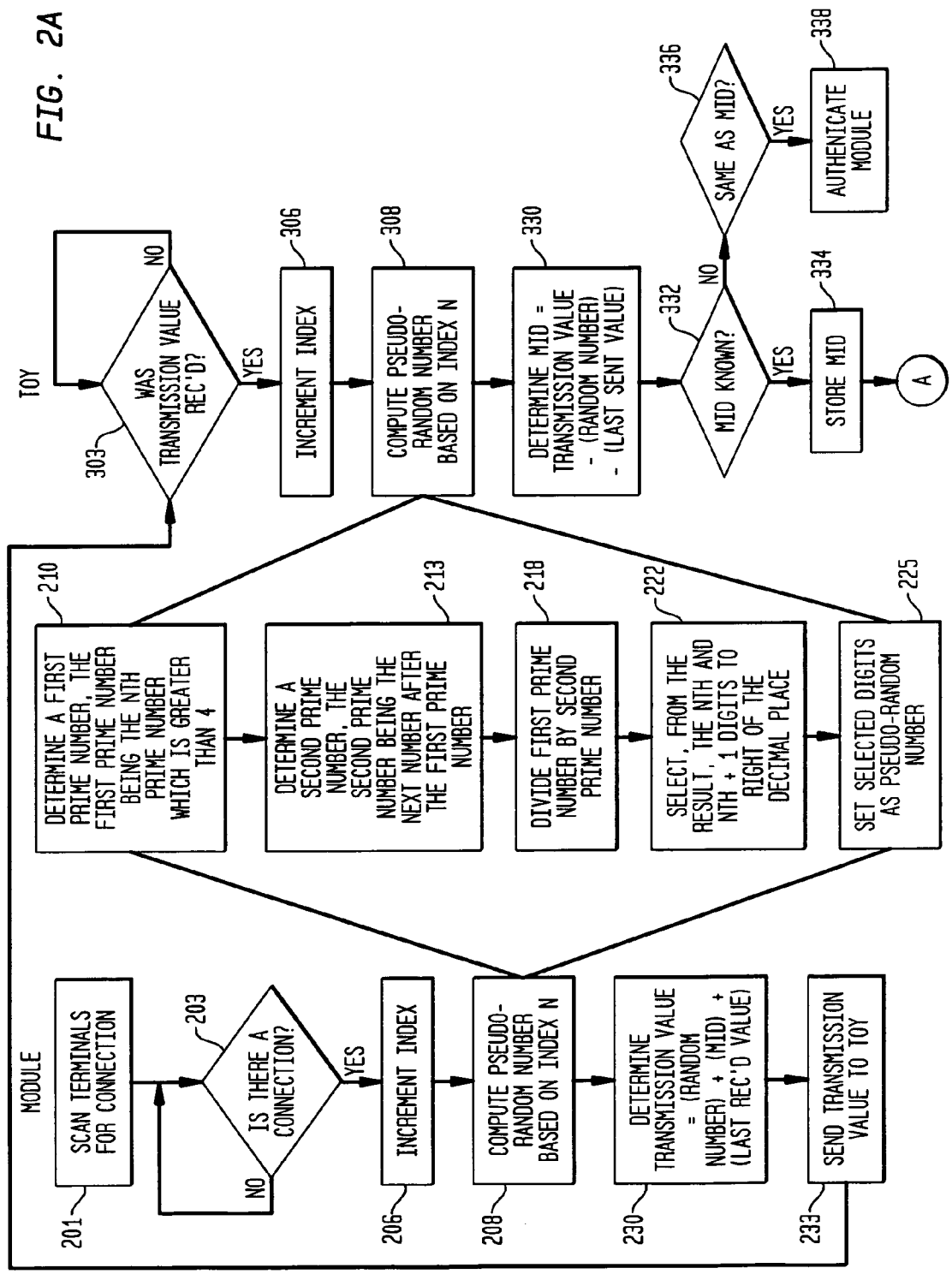
FIGS. 2A–2B are flow charts of a method in accordance with an embodiment of the invention.
Figure 2B:
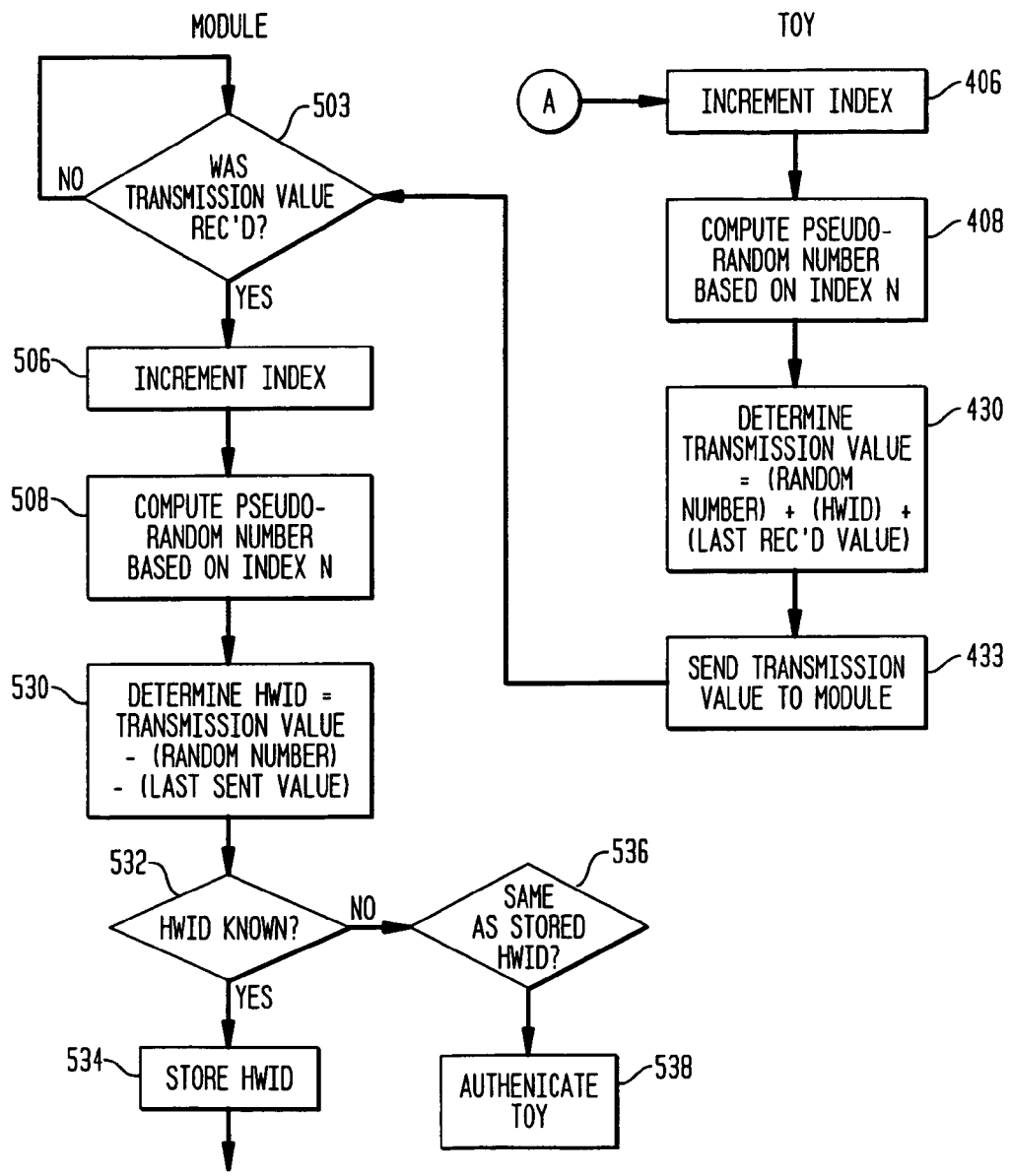

In operation in accordance with one embodiment of the invention as shown in FIG. 2, the devices scan their interfaces to see if a connection was made (reference 201). Once a connection is detected (reference 203), module 110 generates a psuedo-random number using the value of Index 87 as a seed (reference 208).

Although many pseudo-random number generators based on seeds may suffice, one possible algorithm for generating a pseudo-random authentication number comprises the following mathematical operations.

(a) Determining a prime number ("PrimeNumberA") which is a certain number of prime numbers above 4 (reference 210). The "certain number" is the index value 87 (hereinafter referred to as IndexN). For example, if the index value is 1, then the first prime number above 4 is 5, so PrimeNumberA is 5. If the index value is 3, then the third prime number above 4 is 11, so PrimeNumberA is 11.

(b) Determining the prime number ("PrimeNumberB") which is the next prime number after PrimeNumberA (reference 213). For example, if PrimeNumberA is 5, then PrimeNumberB will be 7. If PrimeNumberA is 11, then PrimeNumberB will be 13.

(c) Determining the result of dividing PrimeNumberA by PrimeNumberB (reference 218). For example, if PrimeNumberA is 5 and PrimeNumberB is 7, then the result will be 5/7=0.714285. If PrimeNumberA is 11 and PrimeNumberB is 13, then the result will be 11/13=0.8461538.

(d) Selecting the two digits from the result which are IndexN and IndexN+1 positions to the right of the decimal (reference 222). For example, if the result is 0.714285 . . . and the index value is 1, then the two digits will be 7 and 1 because they are the first and second digits to the right of the decimal point. If the result is 0.8461538 . . . and the index value is 3, then the two digits will be 6 and 1 because they are the third and fourth digits to the right of the decimal point.

(e) Joining the two selected digits together to form a pseudo-random number (reference 225). For example, if the two selected digits are 7 and 1 (as is the case when the index value is 1), then the computed number will be 71. If the two selected digits are 6 and 1, then the computed number will be 61 (as is the case when the index value is 3).

If the pseudo-random number is being generated for the purpose of sending a value to another device such as toy 110, the module 10 will increment the increment counter 82 before generating the random-number (reference 206). Thus, if the module 10 has not been connected to any other devices, the processor 81 will cause the index 87 to be incremented from its default 0 to the value of 1.

Once the pseudo-random number based on the index is determined, the module determines a pseudo-random transmission value which is a function of how many times the module has been connected to the toy as well as its own identification number. Using the foregoing pseudo-random algorithm example, the pseudo-random transmission value may be determined by adding the pseudo-random number to MID 85 (reference 230). The last number that it received from the toy is also added, but at this point in the example that value will be zero because no prior transmission was received from the toy because they have not been connected yet. For example, if the MID value is 25 and the index is 1, then the MID will be added to the pseudo-random value (i.e. 71) associated with the index 1. The transmission value is thus 96.

Once the pseudo-random transmission value is calculated, module 10 sends the transmission value to the toy 110 (reference 233). Using the foregoing example, a transmission value of 86 will be sent to toy 110.

Once the toy detects a transmission value from module 10 (reference 303), it also generates a pseudo-random number (reference 308) based on the number of connections made so far so that it can extract the MID of the module. If toy 110 uses the same pseudo-random algorithm as module 10 and if the increment counters of the toy and module are in sync, then both the toy and the module will generate the same pseudo-random number based on index value. Using the foregoing example and algorithm discussed above, the index value of toy 110 would be incremented to 1 because, in this embodiment, the module would have incremented its index value to 1 from the default of 0 (reference 306). Thus, the pseudo-random value of 71 is calculated by the toy.

Processor 181 of toy 110 then determines the MID embedded in the received transmission value. In this embodiment, it does this by taking the transmission value and subtracting the pseudo-random number that it calculated and the last value that it sent to the module (which at this point will be 0 because it has not sent a value yet) (reference 330). If the MID is not yet known (reference 332), the remainder will be stored in the toy's memory 180 in MID field 185 (reference 334). Using the foregoing example, the toy will subtract the pseudo-random value of 71 from the received value of 96 and store the remainder value of 25 in the MID field.

Toy 110 then communicates it's HWID 185 to the module 10 in a similar manner to the way the module communicated its MID 85 to the toy. Toy 110 increments the index value of the increment counter 182 (reference 406) and processor 181 then calculates a new pseudo-random value based on the current index value (reference 508). Using the foregoing example: the index value of the doll will be incremented from 1 to 2, the second and third prime numbers (7 and 11) above 4 are retrieved; the result (0.636363636363636) is calculated by dividing the second prime number by the third; the second (3) and third (6) digits to the right of the decimal are selected; and the two selected numbers are joined to create a pseudo-random value of 36.

To determine the value to be sent from toy 110 to module 10, processor 181 adds the index-based pseudo-random value to the doll's HWID 186 as well as the value that was last received from the module, i.e. the transmission value sent from the module (reference 430). Using the foregoing example, the HWID value of 40 would be added to the pseudo-random value of 36 and the last received value of 96 to calculate a toy transmission value of 172.

The toy's transmission value is then sent to the module (reference 433).

Once the module 10 detects a transmission value from toy 110 (reference 503), it generates a pseudo-random number based on the index value that toy 110 should have, assuming that toy 110 has only been communicating with module 10. Module 10 thus increments its increment counter 82 to stay in sync with the index value of toy 110 (reference 506). If toy 110 uses the same the pseudo-random algorithm as module 10 and if the increment counters of the toy and module are in sync, then both the toy and the module will generate the same pseudo-random number based on the current index value. Using the foregoing example and algorithm discussed above, the index value of module 10 is incremented from 1 to 2 and a pseudo-random number is determined based on the index value (reference 508). The pseudo-random number will thus be 36 when the index value is 2.

Module 10 then determines the HWID of the toy 110 in the same manner that the toy determined the MID of the module. Using the foregoing example, processor 181 subtracts the pseudorandom number and the transmission value that it sent from the transmission value that it received (reference 530). If the HWID is not yet known (reference 532), then the remainder will be the toy's HWID and this value is stored in the memory 80 in HWID field 86 (reference 534). Using the foregoing example, the module will subtract the pseudo-random value of 36 and the transmission value of 96 that it just sent from the received value of 172, and store the remainder value of 40 (=172−36−96) in the MID field.

At this point, the module 110 and toy 10 have exchanged and stored their information upon initial connection. They will now also be able to authenticate one another upon subsequent connection using nearly the same process.

If the devices have been reconnected (references 201-03), then the module 10 increments the index (reference 206); generates a pseudo-random number based on the value of the index (reference 208); generates a transmission value by adding the index-based pseudo-random value (reference 208) to the module's MID and the last value that was last received from the toy (reference 230); and then sends the transmission value to the toy (reference 233). Using the foregoing example, the module 10 increments the index from 2 to 3, generates the random value of 61 based on the index value of 3, and calculates and sends a transmission value of 258 by adding its ID (25) to the random number (61) to the last transmission value (172). As may be apparent, the index value (3) is not necessarily equal to the number of connections (this is the second connection), but it is still based on, or a function of, the number of connections.

The toy authenticates the module by extracting the MID from the current transmission and comparing it with the MID it has stored. In other words, it increments the counter (from 2 to 3) (reference 306), calculates a pseudo-random number (61) (reference 308) based on the current index value; and calculates the MID by subtracting the random number (61) and its last transmission (172) from the value it just received from the module (258) (reference 330). In this instance, the result will be 25.

Because the toy already knows the MID (reference 332), it compares the MID in the transmission value with the MID in memory (reference 336).

If there is a match, the toy will consider the connected module to be authentic (reference 338). Thus, if necessary, the toy will send data to the currently-connected module which it would not send absent the authentication. The toy may also use information sent by the module to perform functions which it would not have used if the module was not authenticated. The toy may also take some other action upon authenticating the module regardless of any other information stored in the module.

In manner similar to that described above, the toy next encodes its HWID in a pseudo-random number and transmits it to the module so the module can authenticate the toy. Using the foregoing example, the processor of the toy: increments the index value (from 3 to 4) (reference 406); generates a random number (70) based on the index (e.g., it selects the fourth (13) and fifth (17) prime numbers above 4 and joins the fourth (7) and fifth (0) digits of the result (0.764705882352941) of dividing the prime numbers) (reference 408); adds its identification number (40) and the random number (70) and the last value it received from the module (258) to create a pseudo-random transmission value (368) (reference 430); and then sends the transmission value to the module (reference 433).

The module then authenticates the toy by extracting the HWID from the current transmission and comparing it with the HWID it has stored. In other words, it increments the counter (from 3 to 4) (reference 506), calculates a pseudo-random number (70) based on the current index value (reference 508), and calculates the other HWID by subtracting the random number (70) and its last transmission (258) from the value it just received from the module (368) (reference 530). In this instance, the result will be 40 which matches the HWID the module previously stored in its memory.

Accordingly, because there is a match, the module will consider the connected toy to be authentic. Thus, if necessary, the module will send and receive data to and from the currently-connected toy which it may not have been willing to send, or use, before. In other words, either the source of information is accepted (in this case, the toy) or a destination of information is determined to acceptable (in this case, the toy again). Optionally, if one device does not authenticate the other, then an error message may be sent to the device which is trying to be authenticated.

Accordingly, the invention has the advantage of "imprinting" one device in such a manner that it will only work with another device.

The invention is useful in a number of applications. For example, toy 110 could comprise an automated doll and module 10 could be an integrated circuit which provides customized and personalized functionality. Module 10 would store basic software for driving the doll's functionality and features (such as the doll's speech) and may be customized for particular demographics (age, sex, birth date, etc.) It would be advantageous if the two devices could be sold separately, so children would have greater freedom to choose a doll which matches their preferences for both appearance and personality. Moreover, the integrated circuit may include learned information (interests and desires) based upon the interaction with the child via the doll, thus reinforcing the link between doll and integrated circuit. Once the two devices are connected, the doll will have a particular personality which cannot be changed by other children with other modules. Vice versa, other dolls would not be able to receive the learned functionality.

In fact, the invention is not limited to modules and toys but rather any devices which provide information to or require authentication from another device. For example, when expensive software (such as a development tool) is sold, it is often licensed to operate with either one or several work stations. In order to insure that only the contracted number of workstations are used, the users are often given a piece of hardware that attaches to the computer (usually through the parallel port). This hardware provides a data value that will authorize the use of the software. The present invention may be used to limit the use of the software to only the particular machine it is initially connected to. It may also be used to limit the number of times the software may be used.

Another application involves taking a particular mechanical action in response to authentication. For example, a device in accordance with an embodiment of the invention may be used to open a lock in place of a typical mechanical key. The key-device may be waved in front of an electronically-opened lock system and transmit its transmission value via a wireless signal. Neither the key nor the lock need to know the identity of the other beforehand. Instead, it is a "blank" key initially and the first time it is used it "imprints" to that lock, so that the lock cannot be opened or locked with any other key. Similarly, a keyless entry device used for the automobile could be sold separately and "imprints" to the car after the first usage.

A cordless phone could also be imprinted to its base and sold separately. This way more improved handsets could be sold after the initial sale.

The invention is also advantageous with respect to its flexibility. For example, a child may desire a single doll to be capable of different personalities. In this instance, the doll's processor may accept and authenticate a module having any identifier. Moreover, the authentication code generator does not have to be based on either pseudo-random numbers or pre-stored values. Device 10 may have a random number generator which generates a pseudo-random number based on some seed, where the seed relates to a criteria of which both devices are aware such as the current time or temperature. In this instance, both devices should have access to a common seed if it changes from time to time between connections.

However, by using a seed which is dependant upon the number of connections, the invention has the advantage of being able to reject another device if it has connected with a third device (thus bringing it out of sync). Moreover, the index values may be modified to be incremented not just upon connection, but only after an authenticated connection. Thus the index counters provide unique advantages and flexibility by adding another layer of security. If device 110 was successfully connected with a device other than device 10, device 10 will know that because the indices will be different and thus, the ID's that the devices derive will not equal the values they have stored. Accordingly, once a genuine device is connected to a second device, the second device cannot be connected to any other lest it be taken out of sync with the genuine device. The use of pseudo-random number also makes it very difficult for a counterfeiter to determine or predict, and thus fake, the transmission values. For example, the next transmitted value is difficult to determine because the difference between transmitted values changes almost every time (i.e., it is not incrementing at a constant or proportional rate).

In another embodiment, the manufacturer may want to limit the number of times that device 10 can connect with device 110. If so, the index counter can be used to track the number of connections and disable communication when the count has been exceeded.

In yet another embodiment, each device may also include multiple authentication numbers which allow it to communicate with multiple devices. As shown in FIG. 1, memory 80 may include a second HWID 88 and a second index 89 which is used to communicate with another device.

It should also be noted that although devices 10 and 110 have been shown as having identical structure and device 10 initiates the conversation, different steps of the process can take place in either device.

As a further tamper-proof measure, one embodiment uses checksum with the non-volatile memory 80 that stores the indices and IDs. This extra measure will prevent a would-be hacker from erasing the memory and starting again. In this embodiment, the checksum algorithm may return a value of zero if the memory is erased, and authentication will not occur in the presence of a zero checksum. The use of the checksum would also be helpful in determining if the unit's memory in fact did fail as opposed to the user misusing the device and getting an error result. Specifically, if the authentication did not occur and the checksum is non-zero, then that may indicate that memory was inadvertently corrupted as compared to intentionally erased.

Unless stated to the contrary, use of the words such as "including," "containing," "comprising" and the like, means "including without limitation" and shall not be construed to limit any general statement that it follows to the specific or similar items or matters immediately following it.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

What is claims is:

1. A method of transferring information between devices upon connection and reconnection comprising:
   providing a first device having a first identifier;
   providing a second device having a second identifier;
   the first device sending the first identifier to the second device during a first connection;
   the second device sending the second identifier to the first device during the first connection;
   the first device storing the second identifier and the second device storing the first identifier;
   when the first and second devices are disconnected and reconnected, the first device sending the first identifier to the second device and the second device sending the second identifier to the first device during the first reconnection, and each device comparing the received identifier against the stored identifier and sending additional information between the first and second device if the received identifier matches the stored identifier,
   wherein the step of sending an identifier to the other device includes sending a value that is based on, but not equivalent to, the identifier, and
   wherein the value sent by the first device is based on one or more mathematical operations using at least the identifier, the number of times the first device has connected to the second device, and a third number as operands.

2. The method of claim 1 wherein the value sent by the first device is based on the number of times the first device has connected to the second device.

3. The method of claim 2 wherein the difference between the different values sent each time is pseudo-random.

4. The method of claim 2 wherein the value sent by the first device is determined based on at least one mathematical operation, and at least one of the purposes of the mathematical operation is to make it difficult to predict the next value to be sent.

5. The method of claim 1 wherein the third number is a prime number.

6. A method of authenticating a device comprising:
   receiving a first value from the device, the first value being different from an identifier associated with the device;

determining the identifier from the value, the value being a function of the identifier and the number of times the device has been authenticated;

comparing the identifier determined from the value against a pre-stored identifier;

authenticating the device based on the result of the comparison;

receiving a second value from the device after the step of authenticating, this value being different from the first value and different from the identifier;

determining the identifier from the second value, the second value being a function of the identifier and the number of times the device has been authenticated;

comparing the identifier determined from the second value against a pre-stored identifier; and authenticating the device again base on the result of the comparision, wherein the pre-stored value is stored by:

receiving an initial value from the device, the initial value being different from the identifier, the first value and the second value;

determining the identifier from the initial value, the initial value being a function of the identifier; and storing the initial value.

7. The method of claim 6 wherein the difference between the initial value and the second value is different from the difference between first value and the second value.

8. The method of claim 6 further including sending information to the device dependant upon whether the device is authenticated.

9. The method of claim 6 further using information from the device dependant upon whether the device is authenticated.

10. The method of claim 9 further including taking an action dependent upon whether the device is authenticated.

11. The method of claim 6 wherein the function is a pseudo-random generator using the number of times the device have been authenticated as a seed.

12. The method of claim 6 wherein the function is intended to make it difficult to predict the next value to be received.

13. A system which takes an action in response to a signal from a device, the system comprising:

an increment counter associated with a value representing the number of times the system has taken an action in response to a signal from the device;

a pseudo-random number generator using the increment counter value as a seed;

memory for storing a value identifying the device; and instructions including using the value of the increment counter to extract the value identifying the device from a value transmitted from the device, comparing the identification value with the value stored in memory, and authenticating the device if the identification value matches the value stored in memory, wherein the device includes:

an increment counter;

a random number generator using the increment counter of the device value as a seed; and instructions for using the value of the increment counter of the device to create a value for transmission.

14. The system of claim 13 wherein the system is a toy and the device defines functions to be performed by the toy.

15. The system of claim 14 wherein the toy is a doll.

16. The system of claim 13 wherein if the increment counter indicates that the system has not yet taken an action in response to a signal from the device, then the system stores the identification value in memory.

17. The system of claim 16 wherein the system is a lock and the action taken is locking or unlocking.

18. A method of a destination being authenticated by a source comprising the destination:

maintaining a seed value which is equivalent to a seed value maintained at the source, the seed changing over time, generating a value based on the seed and based on a value identifying the destination whereby the generated value is different from the seed and the destination's identification value;

transmitting the generated value to the source; and being authenticated to receive information from the source or send information which will be used by the source, the authentication being dependant upon the source using the seed to extract the destination's identification value and comparing the destination's identification value with the value of a destination known by the source to be authentic, wherein the seed is based on the number of times the destination has been authenticated.

19. The method of claim 18 wherein the generated number is also based on the last generated value sent from the destination to the source.

20. The method of claim 18 further comprising the source: generating a value different from the seed but based on the seed; transmitting the generated value to the destination.

21. The method of claim 20 wherein the value generated by the destination is also based on the last generated value transmitted from the source to the destination.

22. The method of claim 21 wherein the value generated by the source is also based on the last generated value transmitted from the destination to the source.

23. The method of claim 18 further comprising the source:

generating a value based on the seed and based on a value identifying the source whereby the generated value is different from the seed and the source's identification value;

transmitting the generated value to the source; and being authenticated to receive information from the destination or send information which will be used by the destination, the authentication being dependant upon the destination using the seed to extract the source's identification value and comparing the source's identification value with the value of a source known by the destination to be authentic.

24. The method of claim 23 wherein the destination is not authenticated if the destination has already been authenticated a predetermined number of times.

* * * * *

UNITED STATES PATENT AND TRADEMARK OFFICE
CERTIFICATE OF CORRECTION

PATENT NO.       : 7,139,912 B2                                    Page 1 of 1
APPLICATION NO.  : 09/837283
DATED            : November 21, 2006
INVENTOR(S)      : Paul H. Feinberg It is certified that error appears in the above-identified patent and that said Letters Patent is hereby corrected as shown below:

On The Title Page
Item 57, "system is provided" should read --system are provided--
Item 57, "which generates" should read --which generate--
Item 57, "and uses" should read --and use--
Item 57, "preferably counts" should read --preferably count--
Column 1, line 47, "of authenticating" should read --of authenticating the--
Column 2, line 36, "module devices" should read --module device--
Column 4, line 11, "of 86" should read --of 96--
Column 4, line 37, "communicates it's" should read --communicates its--
Column 4, line 66, "same the pseudo-random" should read --same pseudo-random--
Column 5, line 41, "or a function" should read --or is a function--
Column 6, line 28, "to acceptable" should read --to be acceptable--
Column?, line 45, "number also" should read --numbers also--
Column 9, line 16, "again base" should read --again based--

Signed and Sealed this

Eighteenth Day of December, 2007

JON W. DUDAS
*Director of the United States Patent and Trademark Office*